(12) United States Patent
Settle et al.

(10) Patent No.: US 7,925,918 B2
(45) Date of Patent: Apr. 12, 2011

(54) REBUILDING A FAILED DISK IN A DISK ARRAY

(75) Inventors: Jonathan Ian Settle, Southampton (GB); Roderick Guy Moore, Dorset (GB)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/038,759

(22) Filed: Feb. 27, 2008

(65) Prior Publication Data

US 2008/0209263 A1    Aug. 28, 2008

(30) Foreign Application Priority Data

Feb. 27, 2007    (EP) ..................................... 07103119

(51) Int. Cl.
*G06F 11/00* (2006.01)
(52) U.S. Cl. ........................................................... 714/6
(58) Field of Classification Search ...................... 714/6
See application file for complete search history.

(56) References Cited

U.S. PATENT DOCUMENTS

| | | |
|---|---|---|
| 6,898,184 B1 | 5/2005 | Anderson et al. |
| 2004/0085974 A1 | 5/2004 | Mies et al. |
| 2005/0120267 A1* | 6/2005 | Burton et al. .................. 714/13 |

* cited by examiner

*Primary Examiner* — Scott T Baderman
*Assistant Examiner* — Yair Leibovich
(74) *Attorney, Agent, or Firm* — David W. Victor; Konrad Raynes and Victor LLP

(57) ABSTRACT

Provided are a method for operating a disk array, a disk array, and a rebuilding process. The disk array comprises a plurality of data disks and a parity disk. A failed data disk in the disk array is detected and the failed data disk is isolated from the disk array. A rebuild is initiated of the data in the failed data disk to a spare data disk from data in surviving data disks comprising the at least one of the data disks that did not fail and the parity disk in the disk array. An error is detected in one of the surviving data disks. Data is read from the failed data disk. The rebuild of the failed data disk is completed using the surviving data disks, the parity disk, and the data read from the failed data disk.

11 Claims, 5 Drawing Sheets

US 7,925,918 B2

REBUILDING A FAILED DISK IN A DISK ARRAY

CROSS-REFERENCE TO RELATED APPLICATIONS

This applications claims priority benefits under Title 35, Unites States Code, Section 119(a)-(d) or Section 365(b) from European Patent Application No. EP07103119.9, filed on Feb. 27, 2007, by Jonathan Ian SETTLE and Roderick Guy MOORE, and entitled "A DISK ARRAY", which application is incorporated herein by reference in its entirety.

BACKGROUND OF THE INVENTION

1. Field of the Invention

The field of this invention relates to a method, disk array, and rebuilding process to rebuild a failed disk in a disk array.

2. Description of the Related Art

In disk arrays that are configured according to standards such as Redundant Array of Independent Disks ("RAID") 5, when a disk gets rejected, a rebuild takes place using a spare disk to rebuild the data. The rejected drive is commonly bypassed by the disk array, as a failed disk can cause network issues that can affect access to all of the other disks in the array. During a rebuild, in for example, five or ten disk arrays, the disk array system is exposed to medium errors on other disks within the disk array, which will result in sectors in the failed disk being lost (creating kill sectors in that disk). This is the most common form of data loss, and the likelihood of such a data loss occurring increases as the number of disks in the disk array increases, and through the use of low cost disk drives in a server environment. At the present time, one resolution of the problem is to move the disk array system to RAID 6, but this is a more expensive solution, and is not always appropriate in every instance.

It is therefore an object of the invention to improve upon the known art for rebuilding a failed disk in a disk array.

SUMMARY

Provided are a method for operating a disk array, a disk array, and a rebuilding process. The disk array comprises a plurality of data disks and a parity disk. A failed data disk in the disk array is detected and the failed data disk is isolated from the disk array. A rebuild is initiated of the data in the failed data disk to a spare data disk from data in surviving data disks comprising the at least one of the data disks that did not fail and the parity disk in the disk array. An error is detected in one of the surviving data disks. Data is read from the failed data disk. The rebuild of the failed data disk is completed using the surviving data disks, the parity disk, and the data read from the failed data disk.

BRIEF DESCRIPTION OF THE DRAWINGS

Embodiments are described, by way of example only, with reference to the accompanying drawings, in which.

DETAILED DESCRIPTION

According to a first aspect of the embodiments, there is provided a method of operating a disk array, the disk array comprising a plurality of data disks and a parity disk, the method comprising detecting a failed disk in the disk array, isolating the failed disk from the disk array, adding a spare disk to the disk array, starting a rebuild of the data of the failed disk on the spare disk, detecting an error in a sector on a disk, reading data from a corresponding sector of the failed disk, and completing the rebuild of data.

According to a second aspect of the embodiments, there is provided a disk array comprising a plurality of data disks and a parity disk, the disk array operable to detect a failed disk in the disk array, to isolate the failed disk from the disk array, to add a spare disk to the disk array, to start a rebuild of the data of the failed disk on the spare disk, to detect an error in a sector on a disk, to read data from a corresponding sector of the failed disk, and to complete the rebuild of data.

With the described embodiments, it is possible to provide a disk array that is more robust, in situations when a disk of the array has failed. In that situation, if there is a further error in the sector of another disk, then the data from the failed disk cannot be rebuilt. However, the isolation and availability of the failed disk allows this error to be compensated by referring back to the appropriate sector of the failed disk. The isolation of the failed disk ensures that whatever issue exists with the failed disk, this does not affect the operation of the correctly working disks in the array. Data loss and kill sector creation are prevented.

Instead of bypassing the failed disk off the network (and losing access to data on that drive) the failed disk is "zoned", isolated from the whole loop, but still accessible. If a medium error occurs, then the data can be attempted to be reread from the rejected disk without risking the access to the on-going current input/output, which prevents data loss and kill sector creation. The disk that was rejected should remain zoned until a full rebuild of the RAID array has completed. The zoned disk will remain accessible in case a medium error occurs on the other array components while rebuilding occurs.

Advantageously, the step of isolating the failed disk from the disk array comprises physically removing the failed disk from the disk array. This can be achieved in a variety of different ways, but three embodiments are: zoning the failed disk in a network with a pair of initiators, zoning the failed disk in a network with a single initiator, and zoning the failed disk in a network with an SCSI Enclosure Services (SES) node.

Figure 1:
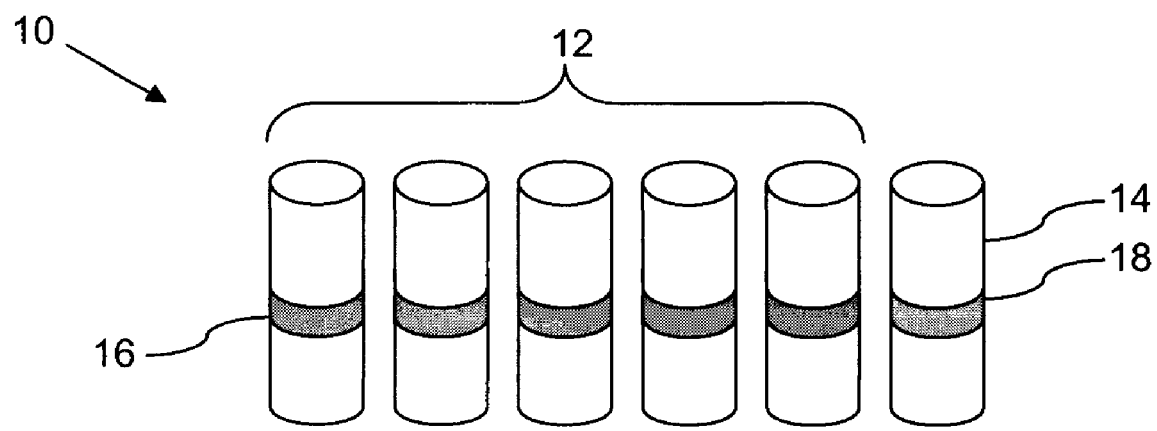
FIG. 1 is a schematic diagram of a disk array.

FIG. 1 shows a disk array 10, which is comprised of five data disks 12 and a single parity disk 14. The disk array 10 is a RAID 5 data storage system. Each of the data disks 12 stores data and the parity disk 14 stores parity data that is calculated based upon the contents of the data disks 12. The data stored by the array 10 is spread across multiple disks 12 with one parity disk 14 to allow for rebuilding of data if one disk 12 fails.

The data disks 12 of the disk array 10 can be considered as columns in an array, with respective sectors within each of the data disks 12 forming rows in the array. The parity sector 18 of the parity disk 14 contains data that is calculated from the contents of the "row" of sectors 16 of the data disks. This allows the data in an individual sector 16 to be recreated, if that sector 16 is unavailable for any reason. The contents of the corresponding sectors 16 in the other data disks 12 and the content of the corresponding parity sector 18 allow the data of the unavailable sector to be reconstructed.

Figure 2:
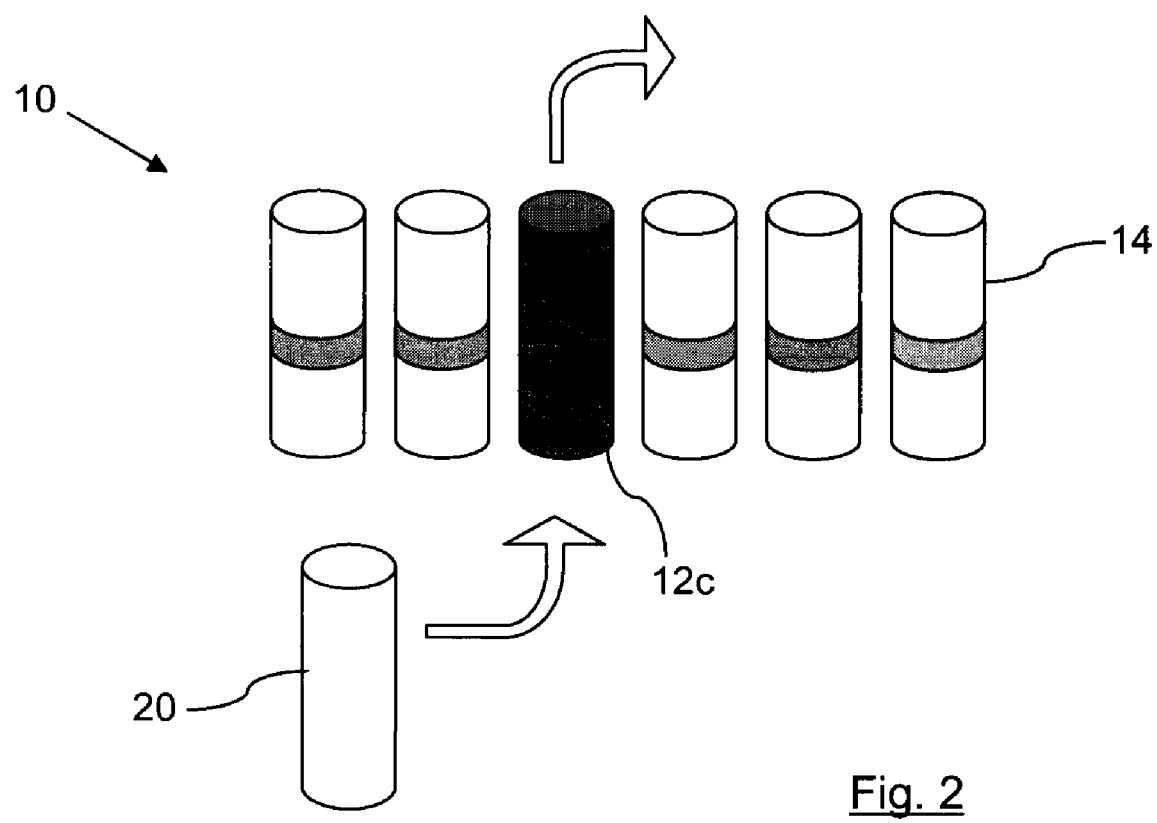
FIG. 2 is a schematic diagram of the disk array of FIG. 1, following detection of a failed disk.

The disk array 10 is configured in such a way that if a failed disk is detected in the disk array 10, then this failed disk is isolated from the disk array 10. FIG. 2 shows a schematic diagram of the disk array 10, in which the data disk 12c is detected to have failed. The failure could be for one of multiple reasons and implies that the disk 12c is no longer a suitable candidate for the array 10, for example, if it is detected that the disk 12c is slow to respond or is hanging commands, or is suffering medium errors.

The failed disk 12c is removed from the disk array 10 and a spare disk 20 is added to the disk array 10 to replace the removed failed disk 12c. The spare disk 20 is shown as a new disk replacing the failed disk 12c, but could be a spare disk in a purely logical sense of a current disk having this new role assigned to it. One method of isolating the disk 12c is to place the failed disk 12c in a zone of a switched arbitrated Fibre Channel loop. This results in the zoning of the rejected disk drive 12c rather than using any bypassing of the disk 12c within the disk network. The computing environment within which the disk array 10 forms a part still has access to the zoned failed disk 12c through the switched loop.

Figure 3:
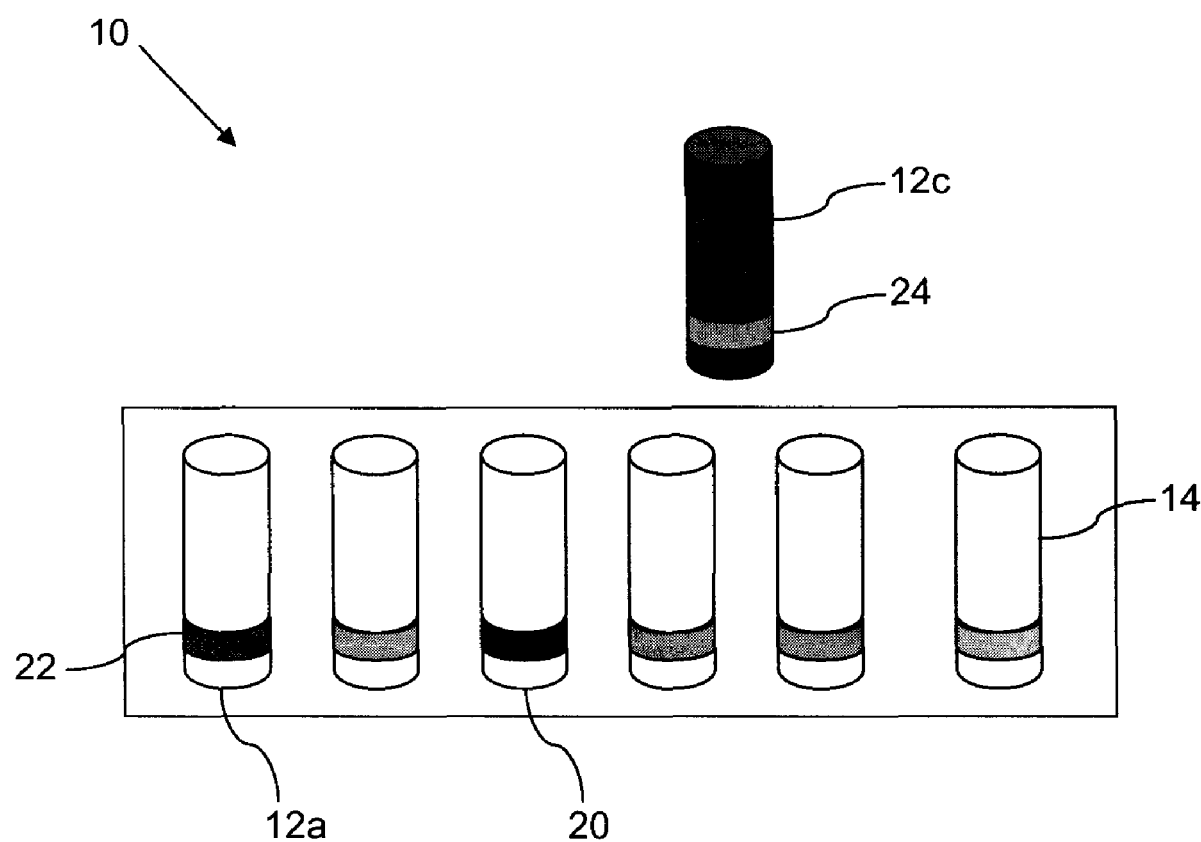
FIG. 3 is a further schematic diagram of the disk array of FIG. 1, during data rebuild.

The disk array 10 is configured so that, following the detection of the failed disk 12c, its isolation and replacement with the spare disk 20, the disk array 10 will start a rebuild of the data of the failed disk 12c on the spare disk 20. This is shown schematically in FIG. 3. The new disk 20 has data written to it sector by sector, using the data on the other data disks 12 and the parity data stored by the parity disk 14. In a normal operation of the disks 12, the data of the failed disk 12c can be rebuilt in this manner.

However if any error occurs on any of the other disks 12, such as a medium error caused by a local corruption of the magnetic material used in the data disks 12, then a kill sector will be created in the spare disk 20. This will happen because the parity data can no longer correct for data missing in two places in a "row" across the disk array 10. The data from the failed disk 12c and the data from the medium error cannot both be compensated by a combination of the data off the other data disks 12 and the parity disk 14.

To ensure that any kill sectors found during the rebuilding process due to medium errors are corrected, the disk array 10 is configured to read the kill sector from the zoned disk 12c. The disk array 10, once there is detection of an error in a sector (as an example, shown at 22 in FIG. 3) on the disk 12a, will read data from a corresponding sector 24 of the failed disk 12c, and therefore complete the rebuild of data in this way. The data read from the zoned rejected disk 12c can provide the missing data and prevent kill sector creation. In this implementation, communication with the isolated disk 12c is via a switched arbitrated Fibre Channel loop. A more generic switched topology for disk communication may also be used.

The configuration of the disk array 10 is such that, instead of bypassing the failed disk 12c off the network, thereby losing access to data on that disk 12c, the disk 12c is configured into a zone which is isolated from the whole loop, and is therefore still accessible. Once the rebuilding process begins, the disk array 10 is operable so that if a medium error is detected, then the data can be read from the rejected disk 12c without the access to the on going current input/output being opened to the risk of a failure extending to other disks 12. This configuration of the disk array 10 helps prevent data loss and kill sector creation, when rebuilding takes place.

Figure 4:
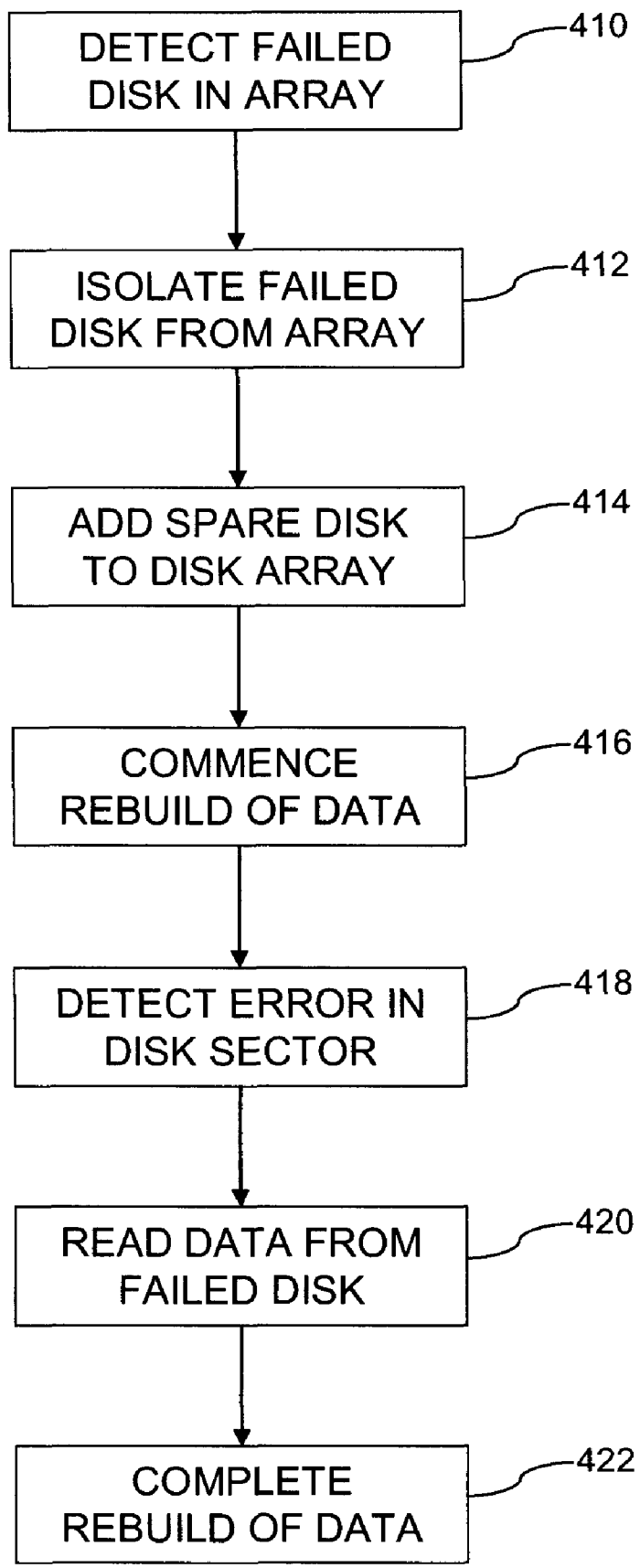
FIG. 4 is a flowchart of a method of operating the disk array.

FIG. 4 shows a flowchart summarizing the operation of the disk array 10. The first step 410 is the step of detecting the failed disk 12c in the disk array 10, followed by the step 412 of isolating the failed disk 12c from the disk array 10. The next step 414 is the adding of the spare disk 20 to the disk array 10 to replace the removed disk 12c. The disk array 10 then starts a rebuild of the data of the failed disk 12c on the spare disk 20, step 416. During the rebuild, the next step is the step 418 of detecting an error in a sector on a disk 12, followed by reading data from a corresponding sector of the failed disk 12c, step 420 and finally completing the rebuild of data at step 422.

Certain embodiments may be based upon the zoning capabilities of the Emulex Inspeed SOC422 switch for Fibre Channel Arbitrated Loops, but could apply to any loop switch tech with zoning. The disk 12c that is rejected should remain zoned until a full rebuild of the disk array 10 has been completed. The zoned disk 12c will remain accessible in case a medium error occurs on the other array components, the disks 12, whilst rebuilding occurs. Three ways of achieving the zoning of the disk 12c are described below.

Figure 5:
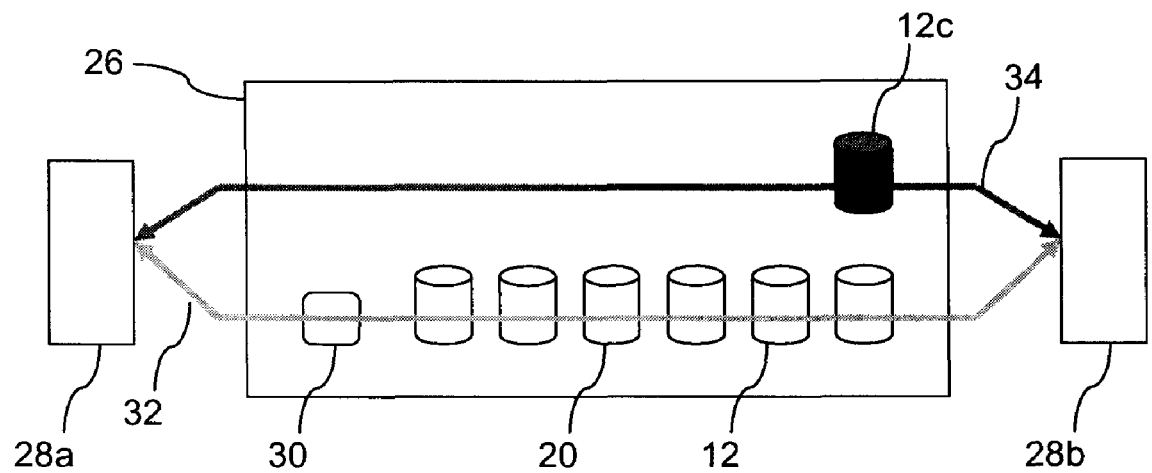
FIG. 5 is a schematic diagram of an enclosure containing a disk array and an isolated failed disk.

FIG. 5 shows a first embodiment of the zoning implementation. An enclosure 26 contains the disk array. Two initiators 28a and 28b are used to communicate with the disks inside the enclosure 26, which also includes an SES node 30. The SES node 30 is an SCSI Enclosure Services node, which is a device in the network that is used for controlling the functions of the enclosure 26.

The failed disk 12c to be isolated is zoned in a network with both initiators and the rejected drive. A good zone 32 is defined by the properly functioning disks 12, the spare disk 20 and the SES node 30 and a bad zone 34 is defined by the rejected disk 12c. This solution has potential problems in that the disk 12c needs to still be capable of communicating with both initiators 28. If the disk 12c has already been rejected then there is something wrong with the disk 12c and using dual initiator transport to the disk drive 12c may be problematic. This solution would have better performance, but as this is designed as a last effort to regain stored data, then speed is not an essential component of the data recovery.

Figure 6:
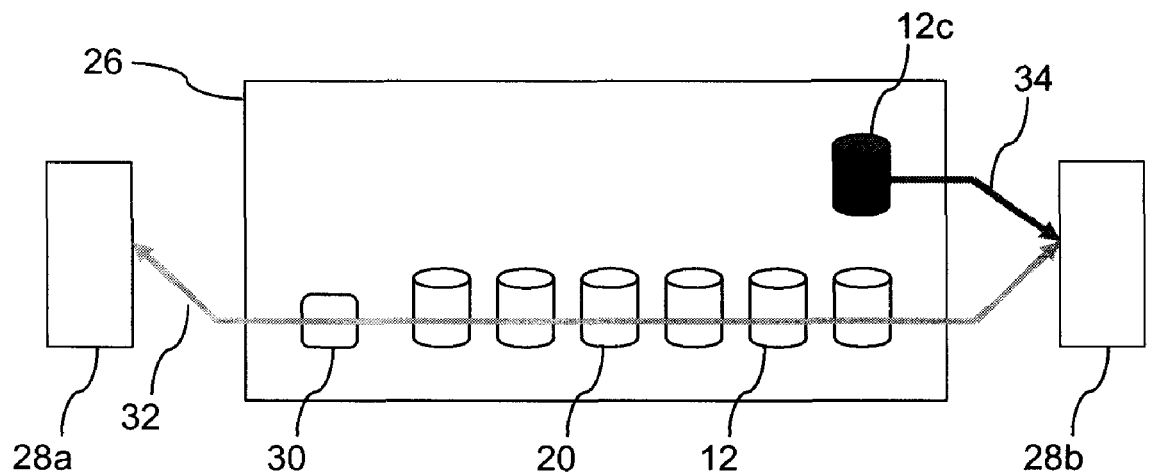
FIG. 6 is a schematic diagram of a second embodiment of an enclosure containing a disk array and an isolated failed disk.

As an alternative, a second zoning implementation is shown in FIG. 6, in which the disk 12c is to be zoned with only one initiator 28b. This reduced the complexity of the states the disk drives are in, as only one initiator 28b would ever request data. The other initiator 28a, if it requires data, can request that the zoned initiator 28b fetch the data and pass it on.

These first two zoning implementations have a downside such that if the zoned disk 12c forced loop configuration then the initiators 28 will still see the configuration cycle and would be affected by possible malfunctioning of the rejected disk 12c. Even with tough policies being set for the zoned disk 12c, there would be an effect on the initiators 28 before the drive could be bypassed completely, such as unwanted configuration cycles and extended link service transactions being submitted to the other "good" zoned drives.

Figure 7:
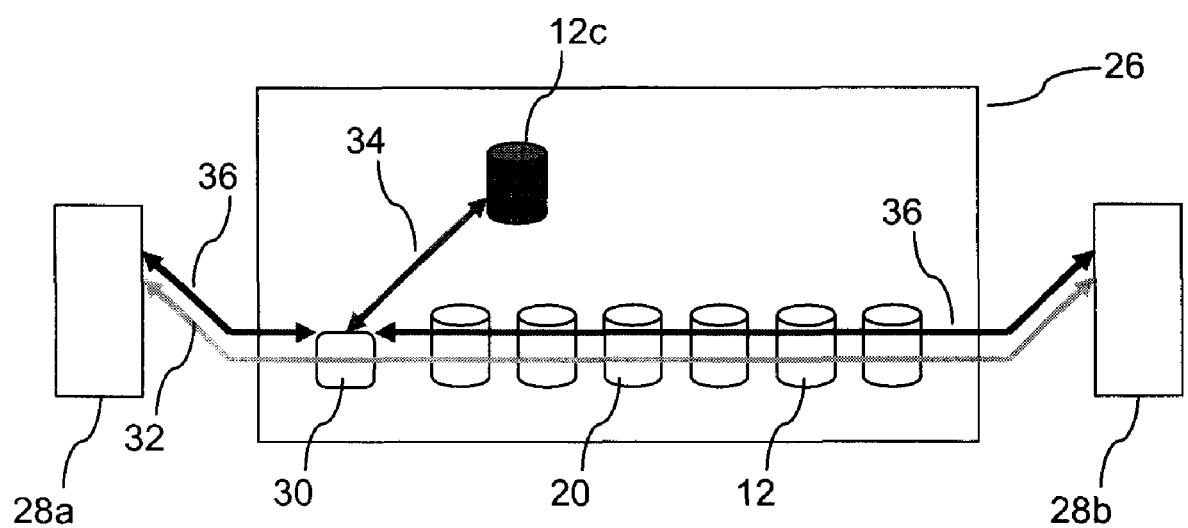
FIG. 7 is a schematic diagram of a third embodiment of an enclosure containing a disk array and an isolated failed disk.

A third solution, shown in FIG. 7, is for the rejected disk drive 12c to be placed in a zone with the SES node 30 and no initiator 28. When an initiator 28 sees a potential kill sector, that initiator 28 would send a request 36 to the SES node 20 to get the required LBA (Logical Block Address, the physical location of a piece of data on a disk drive) from the disk 12c. This has the advantage of the initiators 28 being in a completely separate zone to the potentially misbehaving disk 12c.

In all of these zoned scenarios, the drive could be configured to try any extended ERPs (Error Recovery Procedure, certain routine followed on detection of error to try and dynamically recover from it) necessary to fetch the data. Under normal operation many of the disk ERPs take too long and would not be desirable, in this scenario keeping data intact and available to the customer is the top priority and so the drive could be allowed to do what it can.

What is claimed is:

1. A method of operating a disk array, the disk array comprising a plurality of data disks and a parity disk, the method comprising:
    detecting a failed data disk in the disk array;
    isolating the failed data disk from the disk array by zoning the failed disk in a bad zone of a network accessible to a first initiator and not a second initiator, wherein surviving data disks, a spare disk, and the parity disk of the disk array are zoned in a good zone accessible to the first and second initiators;
    initiating a rebuild of the data in the failed data disk to the spare data disk from data in the surviving data disks comprising the at least one of the data disks that did not fail and the parity disk in the disk array;
    detecting an error in one of the surviving data disks;
    reading data from the failed data disk, and
    completing the rebuild of the failed data disk using the surviving data disks, the parity disk, and the data read from the failed data disk.

2. The method of claim 1, wherein the error is detected in a sector in one of the surviving data disks, and wherein the data read from the failed data disk comprises data read from a corresponding sector in the failed data disk in a row of the disk array including the sector in which the error is detected, wherein the parity data comprises parity sectors, wherein each parity sector is calculated from sectors in a row of the data disks in the disk array.

3. The method of claim 1, wherein the bad zone is accessible to a controller node that is used to read the failed disk, wherein the controller node is further in the good zone.

4. A method of operating a disk array, the disk array comprising a plurality of data disks and a parity disk, the method comprising:
    detecting a failed data disk in the disk array;
    isolating the failed data disk from the disk array by zoning the failed disk in a network in a bad zone accessible to a controller node that is used to read the failed disk, wherein the controller node is further in a good zone including at least one initiator, surviving data disks, a spare disk, and the parity disk;
    initiating a rebuild of the data in the failed data disk to a spare data disk from data in surviving data disks comprising the at least one of the data disks that did not fail and the parity disk in the disk array;
    detecting an error in one of the surviving data disks;
    reading, by the controller, data from the failed disk in response to one of the at least one initiator sending a request to the controller node for the data from the failed disk, wherein the at least one initiator cannot access the bad zone; and
    completing the rebuild of the failed data disk using the surviving data disks, the parity disk, and the data read from the failed data disk.

5. A disk array accessible to a first and second initiators and a network, comprising:
    a plurality of data disks and a parity disk; and
    a rebuild process configured to perform operations in response to detecting a failed disk in the disk array, the operations comprising:
        isolating the failed data disk from the disk array by zoning the failed disk in a bad zone of the network accessible to the first initiator and not the second initiator, wherein surviving data disks, a spare disk, and the parity disk of the disk array are zoned in a good zone accessible to the first and second initiators;
        initiating a rebuild of the data in the failed data disk to the spare data disk from data in the surviving data disks comprising the at least one of the data disks that did not fail and the parity disk in the disk array;
        detecting an error in one of the surviving data disks;
        reading data from the failed data disk, and
        completing the rebuild of the failed data disk using the surviving data disks, the parity disk, and the data read from the failed data disk.

6. The disk array of claim 5, wherein the error is detected in a sector in one of the surviving data disks, and wherein the data read from the failed data disk comprises data read from a corresponding sector in the failed data disk in a row of the disk array including the sector in which the error is detected, wherein the parity data comprises parity sectors, wherein each parity sector is calculated from sectors in a row of the data disks in the disk array.

7. The disk array of claim 5, wherein the disk array further includes a controller node and is accessible to at least one initiator, wherein the bad zone is accessible to the controller node that is used to read the failed disk, wherein the controller node is further in the good zone.

8. A disk array accessible to at least one initiator and in communication with a network, comprising:
    a controller node;
    a plurality of data disks and a parity disk; and
    a rebuild process configured to perform operations in response to detecting a failed disk in the disk array, the operations comprising:
        isolating the failed data disk from the disk array by zoning the failed disk in the network in a bad zone accessible to the controller node that is used to read the failed disk, wherein the controller node is further in a good zone including the at least one initiator, surviving data disks, a spare disk, and the parity disk;
        initiating a rebuild of the data in the failed data disk to a spare data disk from data in the surviving data disks comprising the at least one of the data disks that did not fail and the parity disk in the disk array;
        detecting an error in one of the surviving data disks;
        reading, by the controller node, the data from the failed disk in response to one of the at least one initiator sending a request to the controller node for the data from the failed disk, wherein the at least one initiator cannot access the bad zone; and
        completing the rebuild of the failed data disk using the surviving data disks, the parity disk, and the data read from the failed data disk.

9. A rebuilding process configured within a disk array accessible to a network including a first initiator and a second initiator, wherein the disk array comprises a plurality of data disks and a parity disk, wherein the rebuilding process is operable to perform:
    detecting a failed data disk in the disk array;
    isolating the failed data disk from the disk array by zoning the failed disk in a bad zone of the network accessible to the first initiator and not the second initiator, wherein surviving data disks, a spare disk, and the parity disk of the disk array are zoned in a good zone accessible to the first and second initiators;

initiating a rebuild of the data in the failed data disk to the spare data disk from data in the surviving data disks comprising the at least one of the data disks that did not fail and the parity disk in the disk array;
detecting an error in one of the surviving data disks;
reading data from the failed data disk, and
completing the rebuild of the failed data disk using the surviving data disks, the parity disk, and the data read from the failed data disk.

10. The rebuilding process of claim 9, wherein the bad zone accessible to a controller node that is used to read the failed disk, wherein the controller node is further in a good zone including at least one initiator, the surviving data disks, the spare disk, and the parity disk.

11. A rebuilding process configured within a disk array accessible to a network including at least one initiator and a controller node, wherein the disk array comprises a plurality of data disks and a parity disk, wherein the rebuilding process is operable to perform:
    detecting a failed data disk in the disk array;
    isolating the failed data disk from the disk array by zoning the failed disk in a network in a bad zone accessible to a controller node that is used to read the failed disk, wherein the controller node is further in a good zone including at least one initiator, surviving data disks, a spare disk, and the parity disk;
    initiating a rebuild of the data in the failed data disk to the spare data disk from data in the surviving data disks comprising the at least one of the data disks that did not fail and the parity disk in the disk array;
    detecting an error in one of the surviving data disks;
    reading data from the failed data disk by one of the at least one initiator sending a request to the controller node for the data from the failed disk, wherein the at least one initiator cannot access the bad zone; and
    completing the rebuild of the failed data disk using the surviving data disks, the parity disk, and the data read from the failed data disk.

* * * * *